United States Patent [19]
Dillon

[11] Patent Number: 5,678,509
[45] Date of Patent: Oct. 21, 1997

[54] ALL-IN-ONE LITTER BOX, SLEEPING AREA, AND FOOD AND WATER BOWL SYSTEM USEABLE AS A PET CARRIER

[76] Inventor: Charles E. Dillon, P.O. Box 1132, Mandeville, La. 70470

[21] Appl. No.: 559,238

[22] Filed: Nov. 8, 1995

[51] Int. Cl.⁶ .................................. A01K 1/03; A01K 1/035
[52] U.S. Cl. .................................. 119/496; 119/165; 119/501
[58] Field of Search ........................ 119/28.5, 161, 119/163, 165, 453, 454, 482, 484, 496, 501, 621, 706; 206/372, 373, 374, 375; 312/902

[56] References Cited

U.S. PATENT DOCUMENTS

| | | | |
|---|---|---|---|
| 2,659,345 | 11/1953 | Herbert | 119/28.5 |
| 4,171,683 | 10/1979 | Godin | 119/482 |
| 4,522,150 | 6/1985 | Gershman | 119/165 |
| 4,662,515 | 5/1987 | Newby, Sr. | 312/902 X |
| 4,714,158 | 12/1987 | Oltman et al. | 206/373 X |
| 4,803,952 | 2/1989 | Houser | 119/499 |
| 5,242,050 | 9/1993 | Billings | 206/372 X |

*Primary Examiner*—Robert P. Swiatek
*Assistant Examiner*—Elizabeth Shaw

[57] ABSTRACT

A box having a rectangular base with short upstanding front and rear walls and long upstanding side walls therebetween with an open top. The box also has a small rectangular opening in the front wall for the passage of a cat therethrough. A rectangular tray is positioned over the opened upper edge of the box. The tray has short front and rear walls with long side walls therebetween. A divider box is positioned parallel with, and centrally located between, the front and rear edges of the tray with a handle formed therethrough. The divider bar separates the tray into an eating area and a sleeping area. Removable coupling elements are located between the box and the lid. The coupling elements include apertures formed in the side walls of the box adjacent to the upper edges thereof. Clips are secured to the side walls of the tray adjacent to the lower edges thereof.

6 Claims, 3 Drawing Sheets

ALL-IN-ONE LITTER BOX, SLEEPING AREA, AND FOOD AND WATER BOWL SYSTEM USEABLE AS A PET CARRIER

BACKGROUND OF THE INVENTION

1. Field of the Invention

The present invention relates to an all-in-one litter box, sleeping area, and food and water bowl system useable as a pet carrier for cats and more particularly pertains to alleviating the problem of the unsightly appearance of a litter box and its odor while allowing a cat to sleep and eat in an adjacent area.

2. Description of the Prior Art

The use of litter boxes, sleeping areas, feeding areas, and pet carriers for cats of a wide variety of designs and configurations to render them more convenient to use is known in the prior art. More specifically, litter boxes, sleeping areas, feeding areas, and pet carriers heretofore devised and utilized for the purpose of configuring cat-related articles through various methods and apparatuses are known to consist basically of familiar, expected and obvious structural configurations, notwithstanding the myriad of designs encompassed by the crowded prior art which has been developed for the fulfillment of countless objectives and requirements.

By way of example, the prior art discloses in U.S. Pat. No. 3,618,568 to Breeden a pet house in the form of an attractive piece of furniture.

U.S. Pat. No. 5,092,270 to Simons et al. discloses a dual compartmented carrier cage for cats or other small animals.

U.S. Pat. No. 5,092,277 to Baillie et al. discloses a cat litter containment system comprising two levels and open-grid construction.

U.S. Pat. No. 5,148,768 to Hinton discloses a pet house apparatus with a plurality of drawer-like containers mounted between an upper and lower floor.

U.S. Pat. No. 5,184,568 to Healey discloses a cat scratching housing and bed apparatus arranged to simulate a piece of household furniture.

Lastly, U.S. Pat. No. 5,195,457 to Namanny discloses a pet enclosure adapted to be mounted to a window sill.

In this respect, the all-in-one litter box, sleeping area, and food and water bowl system useable as a pet carrier according to the present invention substantially departs from the conventional concepts and designs of the prior art, and in so doing provides an apparatus primary developed for the purpose of alleviating the problem of the unsightly appearance of a litter box and its odor while allowing a cat to sleep and eat in an adjacent area.

Therefore, it can be appreciated that there exists a continuing need for a new and improved all-in-one litter box, sleeping area, and food and water bowl system useable as a pet carrier for cats which can be used for alleviating the problem of the unsightly appearance of a litter box and its odor while allowing a cat to sleep and eat in an adjacent area. In this regard, the present invention substantially fulfills this need.

SUMMARY OF THE INVENTION

In view of the foregoing disadvantages inherent in the known types of litter boxes, sleeping areas, and feeding areas for cats of a wide variety of designs and configurations to render them more convenient to use now present in the prior art, the present invention provides an improved all-in-one litter box, sleeping area, food and water bowl system useable as a pet carrier for cats. As such, the general purpose of the present invention, which will be described subsequently in greater detail, is to provide a new and improved all-in-one litter box, sleeping area, food and water bowl system useable as a pet carrier for cats and method which has all the advantages of the prior art and none of the disadvantages.

To attain this, the present invention essentially comprises a new and improved all-in-one litter box, sleeping area, food and water bowl system useable as a pet carrier for cats comprising, in combination, a box having a rectangular base with short upstanding front and rear walls and long upstanding side walls therebetween and an open top, the box having a small rectangular opening in the front wall for the passage of a cat therethrough, the box also having a large rectangular opening in the rear wall with vertical side tracks on the sides of the large rectangular opening and a horizontal stop at the bottom of the large rectangular opening coupled at its ends to the lower ends of the side tacks, the box also having a rectangular door slidable within the side tracks between a raised open orientation and a lowered closed orientation with a finger hole formed in the door; a carpet removably positioned over a first portion of the base leaving a second uncarpeted portion of a size to receive a litter box; a rectangular tray positioned over the opened upper edge of the box, the tray having short front and rear walls with long side walls therebetween with a divider bar positioned parallel with, and centrally located between, the front and rear edges of the tray with a handle formed therethrough, the divider bar separating the tray into an eating area and a sleeping area adapted to receive a cushion; a water bowl and a food bowl coupled together with a central gripping area therebetween positioned in the eating area; a roof having parallel vertical side panels with lower edges positionable upon the side walls of the tray and upwardly inverted V-shaped central panels coupling the upper edges of the side panels to form a roof with carpeting on the upper surface of the central panels for functioning as a scratching post for a cat; and removable coupling elements between the box and the lid, the coupling elements including apertures formed in the side walls of the box adjacent to the upper edges thereof and clips secured to the side walls of the tray adjacent to the lower edges thereof removably receivable within the apertures of the box.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved all-in-one litter box, sleeping area, food and water bowl system useable as a pet carrier for cats of a wide variety of designs and configurations to render them more convenient to use which has all the advantages and none of the disadvantages.

It is another object of the present invention to provide a new and improved all-in-one litter box, sleeping area, food and water bowl system useable as a pet carrier for cats which may be easily and efficiently manufactured and marketed.

It is a further object of the present invention to provide a new and improved all-in-one litter box, sleeping area, food and water bowl system useable as a pet carrier for cats which is of a durable and reliable construction.

An even further object of the present invention is to provide a new and improved all-in-one litter box, sleeping area, food and water bowl system useable as a pet carrier for cats which is susceptible of a low cost of manufacture with regard to both materials and labor, and which accordingly is then susceptible of low prices of sale to the consuming public, thereby making such litter boxes, sleeping areas, food and water bowl systems useable as pet carriers for cats economically available to the buying public.

Still yet another object of the present invention is to provide a new and improved all-in-one litter box, sleeping area, food and water bowl system useable as a pet carrier for cats which provides in the apparatuses and methods of the prior art some of the advantages thereof, while simultaneously overcoming some of the disadvantages normally associated therewith.

Even still another object of the present invention is to alleviate the problem of the unsightly appearance of a litter box and its odor while allowing a cat to sleep and eat in an adjacent area.

Lastly, it is an object of the present invention to provide an all-in-one litter box, sleeping area, food and water bowl system useable as a pet carrier for cats. The present invention comprises a box having a rectangular base with short upstanding front and rear walls and long upstanding side walls therebetween and open top. The box having a small rectangular opening in the front wall for the passage of a cat therethrough. A rectangular tray is positioned over the opened upper edge of the box. The tray has short front and rear walls with long side walls therebetween. A divider bar is positioned parallel with and centrally located between, the front and ear edges of the tray with a handle formed therethrough. The divider bar separates the tray into an eating area and a sleeping area adapted to receive a cushion. Removable coupling elements are located between the box and the lid. The coupling elements include apertures formed int eh side walls to the box adjacent to the upper edges thereof. Clips are secured to the side walls of the tray adjacent to the lower edges thereof removably receivable within the apertures of the box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiment.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
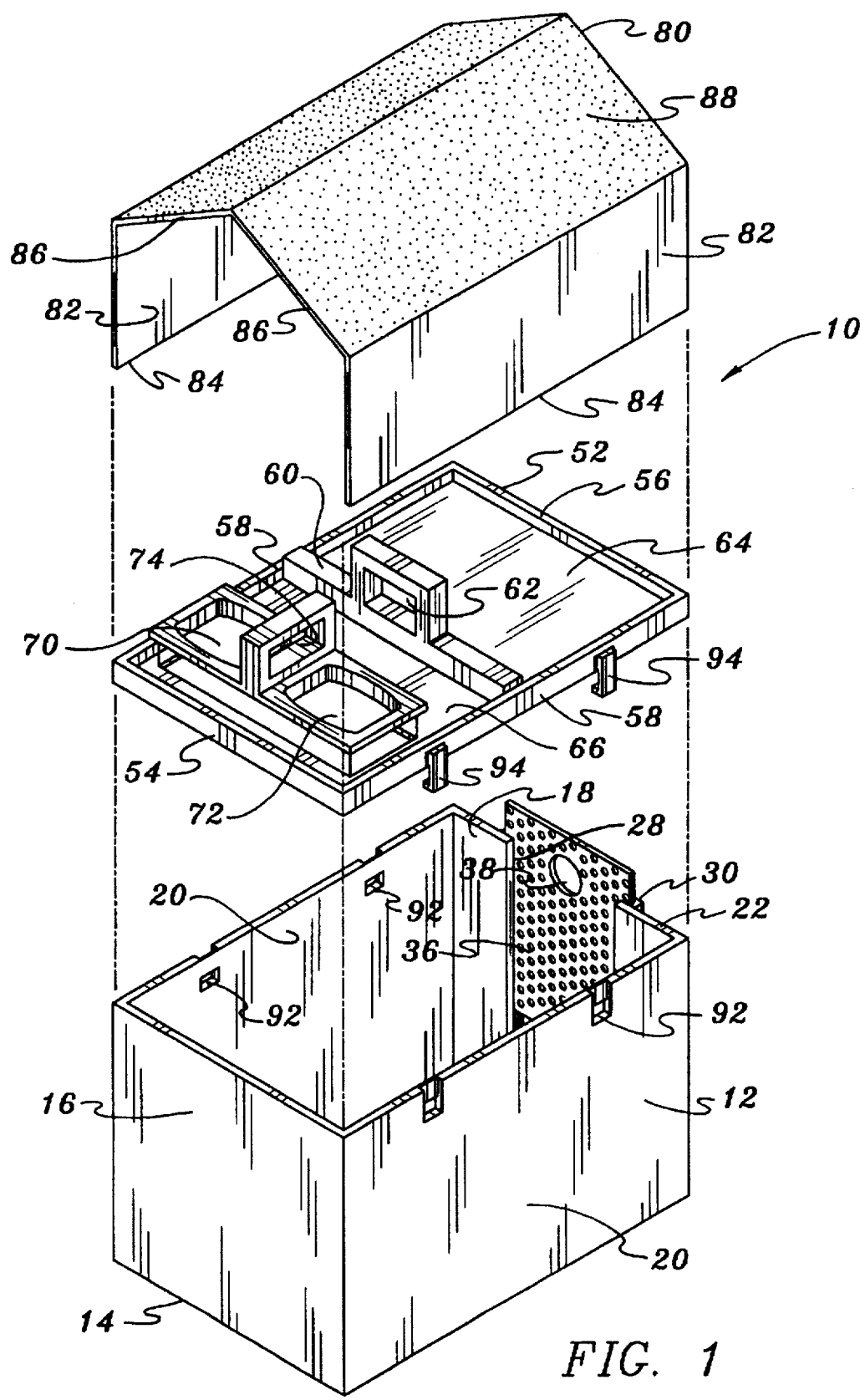
FIG. 1 is an exploded perspective view of the preferred embodiment of the new and improved all-in-one litter box, sleeping area, food and water bowl system useable as a pet carrier for cats constructed in accordance with the principles of the present invention.
Figure 2:
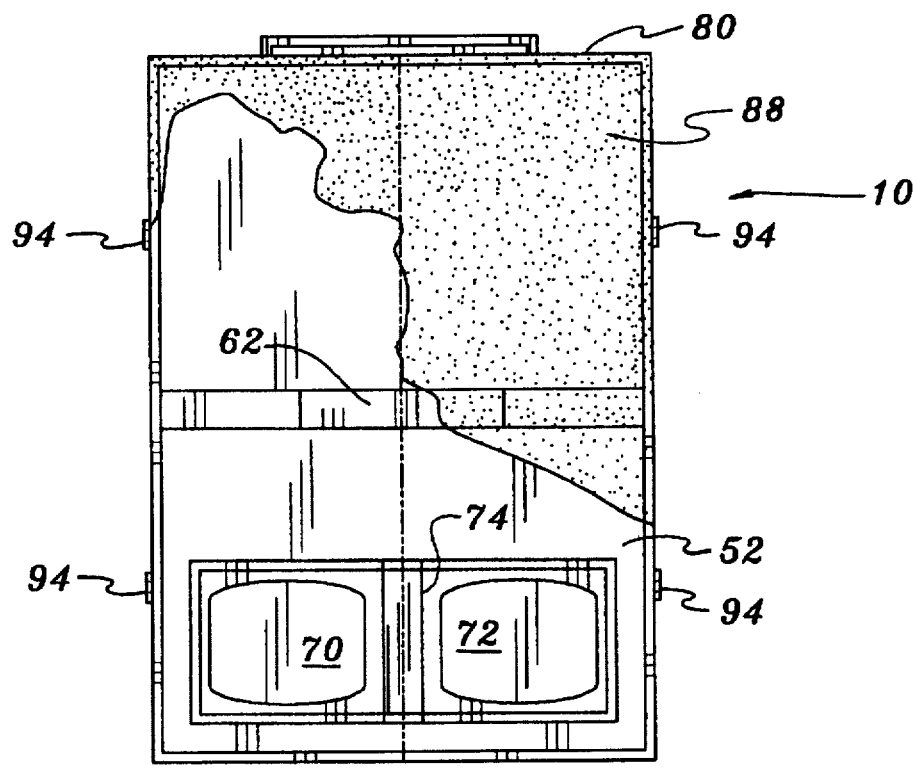
FIG. 2 is a top elevational view of the device shown in FIG. 1 with a portion of the roof removed to show certain internal constructions thereof.

With reference now to the drawings, and in particular to FIG. 1 thereof, the preferred embodiment of the new and improved all-in-one litter box, sleeping area, food and water bowl usable as a pet carrier for cats embodying the principles and concepts of the present invention and generally designated by the reference numeral 10 will be described.

The present invention, the new and improved all-in-one litter box, sleeping area, food and water bowl system, usable as a pet carrier for cats, is a system 10 comprised of a plurality of components. In their broadest context, the components include a box, a carpet, a tray, water and food bowls, a roof and coupling elements. Each of the individual components is specifically configured and correlated one with respect to the other so as to attain the desired objectives.

The present invention, the all-in-one litter box, sleeping area, food and water bowl, usable as a pet carrier 10 for cats, has as its central component a box 12. Such box has a rectangular base 14. It also has short upstanding front and rear walls 16, 18. It also has long upstanding side walls 20 between the front and rear walls. The lower edges of the various walls are coupled to the peripheral edges of the base to form a box-like configuration. The box 12 has an open top 22.

Formed one wall is a large rectangular opening 28. It is preferably centrally located side to side and near the lower edge thereof. It is of a size sufficient for the passage of a cat therethrough. Also included is a large rectangular opening 28. Such opening is in the rear wall centrally located from side to side and adjacent to the lower edge thereof. Such large rectangular opening is provided with vertical side tracks 30 on the sides of the large rectangular opening. Also included is a horizontal stop 32. Such horizontal stop is in the nature of a track similar to the side tracks. The horizontal stop is located at the bottom of the large rectangular opening. It is coupled at its ends to the lower ends of the side tracks.

The side tracks and horizontal stop are configured to receive a rectangular door 36. Such door is slidable within the tracks. It is slidable between a raised open orientation and a lowered closed orientation. The door has a finger hole 38 formed therethrough adjacent to the upper edge to allow a user to more conveniently raise and lower the door. The door 36 is preferably fabricated of a plastic mesh with apertures for ventilation. It is adapted to be housed under the pillow in the sleeping area 64 when not fitted into the tracks.

Comfort is provided to the system 10 of the present invention through the use of a carpet 42. Such carpet is removably positioned in a first portion 44 upon the upper surface of the base 14. This leaves a second, uncarpeted portion 46 on the upper surface of the base. Such uncarpeted portion is of a size to receive a litter box 48 of a conventional configuration.

Next provided is a major component of the system 10 is a rectangular tray 52. Such tray is positioned over the upper edge of the box. The periphery of the tray and the periphery of the box are of a common size to allow mating engagement therebetween. The tray has short front and rear walls 54, 56 with long side walls 58 therebetween. Also provided on the tray is a divider bar 60. The divider bar is positioned parallel with the front and rear edges. It is also located centrally therebetween such edges. The divider bar is formed with a handle 62 formed as an opening therethrough. This allows convenient lifting and positioning of the tray with respect to the box. The handle also is large enough to facilitate carrying the device when the device is used as a pet carrier. The divider bar separates the tray into a sleeping area 64 adapted to receive a pillow or a blanket or the like for the comfort of a resting cat. On the opposite side of the divider bar on the upper surface of the tray is an eating area 66.

Located within the eating area is a water bowl 70 and a food bowl 72. Such bowls are coupled together with a central grip 74 located therebetween. The bowls and grip are positionable in the eating area of the tray.

Figure 3:
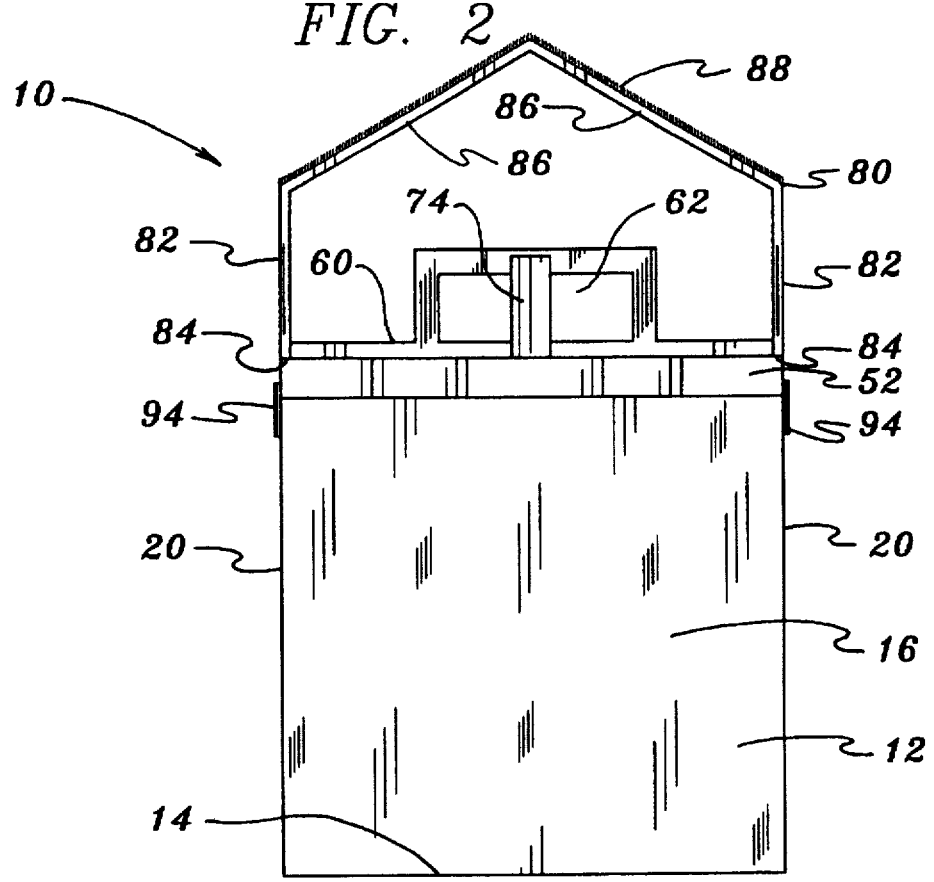
FIG. 3 is a front elevational view of the device of FIGS. 1 and 2.
Figure 4:
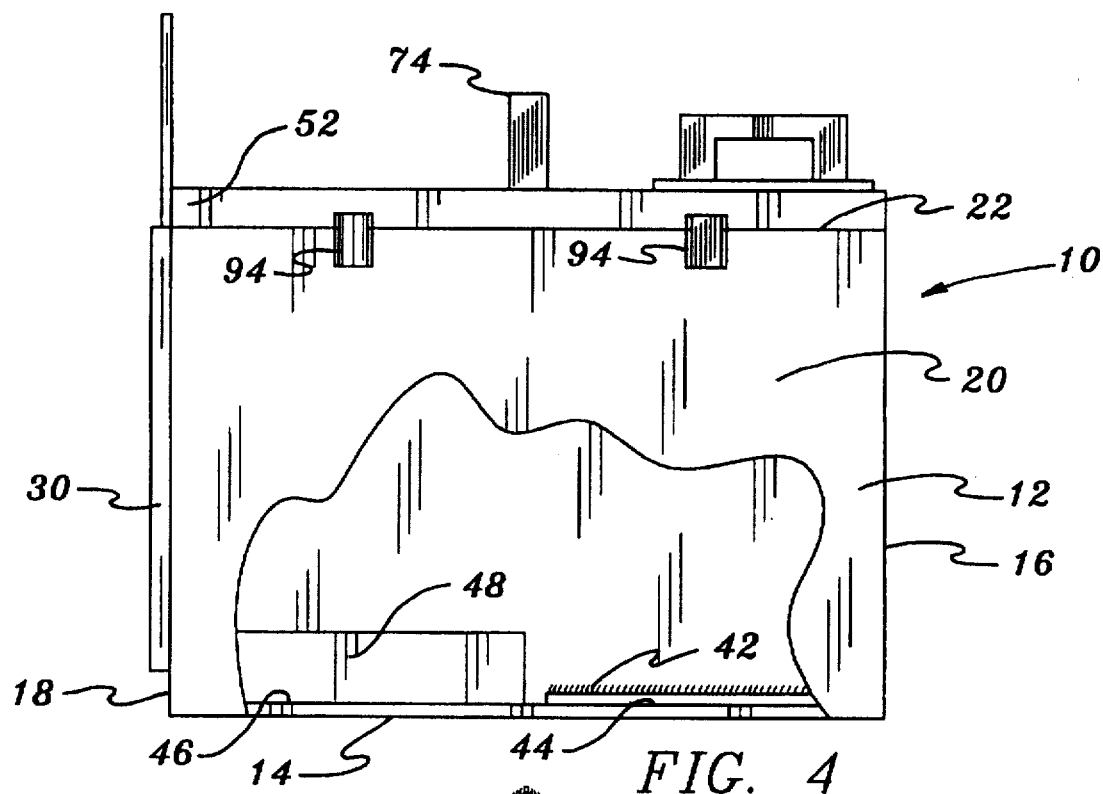
FIG. 4 is a side elevational view of the device shown in the prior Figures with the roof removed and with a portion of the side broken away to show certain internal constructions thereof.
Figure 5:
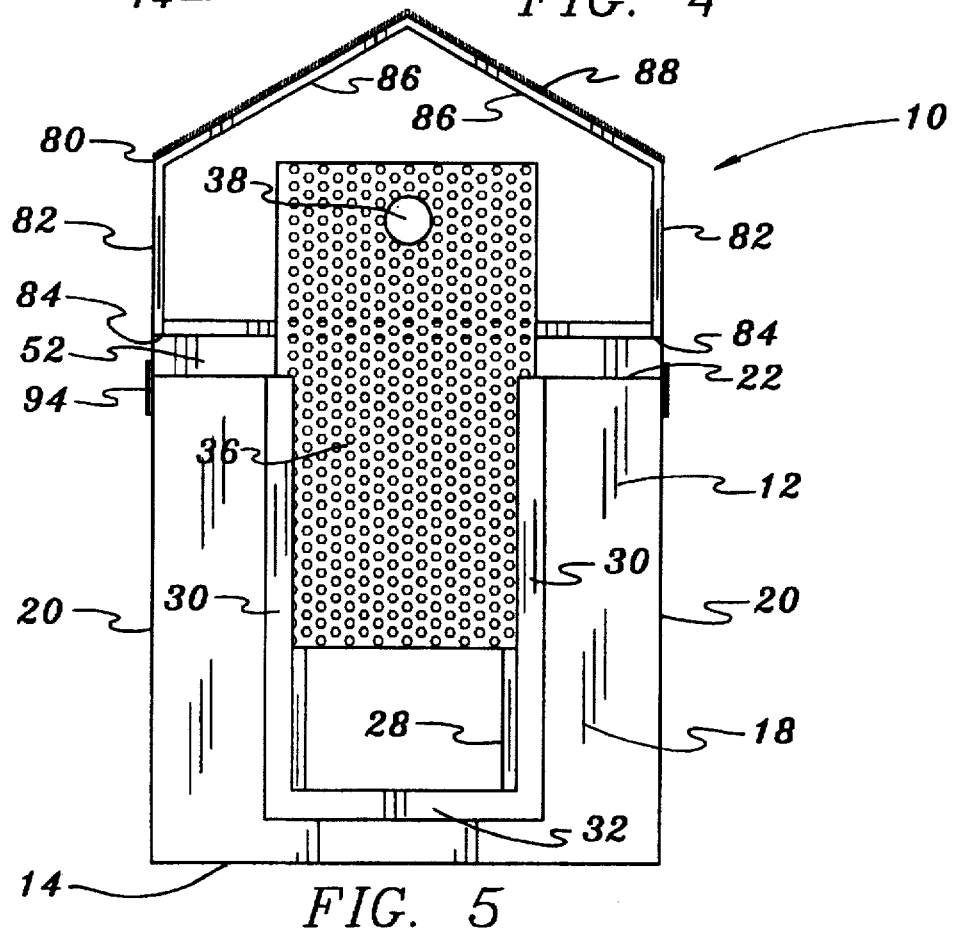
FIG. 5 is a rear elevational view of the device of the prior Figure.

Formed as an optional addenda to the box and tray and other components of the system 10 is a roof 80. The roof is formed with parallel vertical side panels 82. Such side panels have lower edges 84 positionable upon the side walls of the tray. Note FIGS. 3 and 5. The roof also has central panels 86 upstanding at an angle in an inverted V-shape configuration. Such panels are centrally located with respect to the remainder of the roof and couple at their lower edges with the upper edges of the side panels. Together such side and central panels form a roof. Such roof is preferably formed with carpeting 88 on the upper surface thereof. The carpeting on the central panels of the roof function as a scratching post for the cat.

In addition to functioning as a roof, such roof also functions as a removable lid which, when coupled with the remainder of the device, will function as a roof when used as a pet carrier.

The last component of the system 10 is removable coupling elements. Such coupling elements are located between the box and the lid. The coupling components include apertures 92, preferably two on each side, formed in the side walls of the box. They are located adjacent to the upper edges of the box. The coupling components also include clips 94. Such clips are secured to the side walls of the tray adjacent to their lower edges. They extend downwardly beneath the tray and are adapted to be removably received within the apertures of the box. It is preferred for ease of construction that the entire box, tray and lid be fabricated of a relatively rigid plastic material. The same plastic can be used for all of the components.

The present invention offers a product that would be ideal for the cat owner who has limited space and/or does not care to look at an open litter box. The invention utilizes a snap-off lid containing a place to put a pillow for the cat to sleep on. The top would also contain a removable tray with recessed food and water bowls. The tray would easily lift off from the top for refilling and cleaning of the bowls.

The inside of the present invention could contain a standard litter box and a carpeted area to catch excess litter from the cat's paws. The carpet would help to prevent the cat from tracking litter onto the floor once he leaves the box.

The front panel of the present invention contains a door that would conveniently slide down into a locked position, thus converting the box into a cat carrier. This feature would be ideal for transporting the cat from home to the veterinarian or for trips away from home.

A deluxe model would also be available. In addition to the features of the base model, the deluxe model would have a removable sloped roof which attaches to the top of the box. This roof would be carpeted and act as a scratching post for the cat. The front and back ends would remain open to allow for easy access to the food, water and pillow.

The present invention would be produced of durable plastic, and would be available in a variety of attractive colors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size materials, shape, form, function and manner of operation, assembly and use, are deemed readily apparent and obvious to one skilled in the art, and al equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved all-in-one litter box, sleeping area, food and water bowl system usable as a pet carrier for cats comprising, in combination:

a box having a rectangular base with short upstanding front and rear walls and long upstanding side walls therebetween and an open top, the box having a small rectangular opening in the front wall for the passage of a cat therethrough, the box also having a large rectangular opening in the rear wall with vertical side tracks on the sides of the large rectangular opening and a horizontal stop at the bottom of the large rectangular opening coupled at its ends to the lower ends of the side tracks, the box also having a rectangular door slidable within the side tracks between a raised open orientation and a lowered closed orientation with a finger hole formed in the door;

a carpet removably positioned over a first portion of the base leaving a second uncarpeted portion of a size to receive a litter box;

a rectangular tray positioned over the opened upper edge of the box, the tray having short front and rear walls with long side walls therebetween with a divider bar positioned parallel with, and centrally located between, the front and rear edges of the tray with a handle formed therethrough, the divider bar separating the tray into an eating area and a sleeping area adapted to receive a cushion;

a water bowl and a food bowl coupled together with a central gripping area therebetween positioned in the eating area;

a roof having parallel vertical side panels with lower edges positionable upon the side walls of the tray and upwardly inverted V-shaped central panels coupling the upper edge of the side panels to form a roof with carpeting on the upper surface of the central panels for functioning as a scratching post for a cat; and removable coupling means, the coupling means including apertures formed in the side walls of the box adjacent to the upper edges thereof and clips secured to the side walls of the tray adjacent to the lower edges thereof removably receivable within the apertures of the box.

2. An all-in-one litter box, sleeping area, food and water bowl system usable as a pet carrier for cats comprising:

a box having a rectangular base with short upstanding front and rear walls and long upstanding side walls therebetween and an open top, the box having a small rectangular opening in the front wall for the passage of a cat therethrough;

a rectangular tray positioned over the opened upper edge of the box, the tray having short front and rear walls with long side walls therebetween with a divider bar positioned parallel with, and centrally located between, the front and rear edges of the tray with a handle formed therethrough, the divider separating the tray into an eating area and a sleeping area adapted to receive a cushion; and removable coupling elements, the coupling elements including apertures formed in the side walls of the box adjacent to the upper edges thereof and clips secured to the side walls of the tray adjacent to the lower edges thereof removably receivable within the apertures of the box.

3. The device as set forth in claim 2 and further including:

a carpet removably positioned over a first portion of the base leaving a second uncarpeted portion of a size to receive a litter box.

4. The device as set forth in claim 2 and further including:

a water bowl and a food bowl coupled together with a central gripping area therebetween positioned in the eating area.

5. The device as set forth in claim 2 and further including:

a roof having parallel vertical side panels with lower edges positionable upon the side walls of the tray and upwardly inverted V-shaped central panels coupling the upper edges of the side panels to form a roof with carpeting on the upper surface of the central panels for functioning as a scratching post for a cat.

6. The device as set forth in claim 2 and further including:

a box having a large rectangular opening in the rear wall with vertical side tracks on the sides of the large rectangular opening and a horizontal stop at the bottom of the large rectangular opening coupled at its ends to the lower ends of the side tracks, the box also having a rectangular door slidable within the side tracks between a raised orientation and a lowered closed orientation with a finger hole formed in the door.

* * * * *